3,471,276
PERIPHERAL ABRASIVE WHEELS WITH COMPOSITE RIMS
Chester G. Bragaw, Jr., West Chester, Pa., assignor to E. I. du Pont de Nemours and Company, Wilmington, Del., a corporation of Delaware
No Drawing. Filed Nov. 2, 1966, Ser. No. 591,443
Int. Cl. B24d 5/00; C08h 17/12
U.S. Cl. 51—293                                                17 Claims

ABSTRACT OF THE DISCLOSURE

Grinding wheels having a metal core and a composite rim formed of two layers the outer layer being from 100 to 250 mils thick and containing from 10 to 35 volume percent diamonds, from 90 to 50 volume percent of a solid coalesced aromatic polyimide and from 0 to 40 volume percent of an inert filler and an inner layer from 50 to 500 mils thick containing from 10 to 60 volume percent of a filler such as metal, glass, or an abrasive, and from 90 to 40 volume percent of a synthetic resin having a second order glass transition temperature of at least 300° C. and a room temperature modulus of elasticity of at least 300,000 p.s.i. The outer layer of the composite rim is made up as a separate preform which is then used as part of the mold to form the inner layer. The composite can then be mounted on a core or a core can be used as part of the mold in forming the composite rim in which case the composite rim will already be mounted on the core.

---

The present invention relates to an improved grinding wheel and a process of producing such grinding wheels.

In the past, diamond grinding wheels utilizing polyimide binders have been formed by sintering the diamond-containing polyimide rim followed by mounting the rim on a core generally formed of aluminum by applying an adhesive to the core followed by shrink fitting the rim on the core by heating the rim to 75 to 300° C. while either cooling the core or leaving it at room temperature, fitting the rim on the core and then allowing the entire grinding wheel to return to room temperature. The core is expanded to a size such that the rim sustains a total permanent strain of from 0.5 to 1.5 percent. The adhesive is then heat cured if necessary. Suitable adhesive include epoxy and phenol formaldehyde adhesives. Grinding wheels formed in this manner suffer a decreasing grinding ratio as the abrasive portion is worn away and the portion of the rim nearer the core is being used. Furthermore, these grinding wheels often chip at the edges or become unglued in spots from the core when the rim becomes thin from use. The expense involved through this ineffective use of the diamonds near the core and their loss through chipping can be substantial and the present invention is directed toward elimination of the chipping problem and obtaining a more nearly constant grinding ratio throughout the life of the grinding wheel.

The grinding wheels of the present invention utilize a composite resinoid rim consisting of an outer layer of diamond grains bonded together with an aromatic polyimide resin, which may contain additional fillers, and an inner layer of resin-bonded fillers such that the elastic modulus of the inner layer is matched to that of the outer layer by controlling the resin from which such inner layer is formed as well as by the quantity and kind of filler it contains.

The outer layer of the composite rim is preferably formed of from 50 to 90 volume percent of an aromatic polyimide which is coalesceable by application of high temperatures and pressures and from 10 to 35 volume percent of diamond grains. Generally, the diamond grains used are from 10 to 200 microns in size. If desired, the outer layer can also contain up to 40 volume percent as based on the total composition of additional inert fillers such as glass, metal fibers, metal powders, silicon carbide, alundum, molybdenum sulfide, or silicon dioxide.

Generally, the inner layer is formed of a synthetic resin having a second order glass transition temperature of at least 300° C. and a modulus of elasticity of at least 300,000 p.s.i. at room temperature as measured by ASTM D-790. Such resins include aromatic polyimides which are coalesceable by application of high temperatures and pressures, phenol formaldehyde resins, polybenzimidazoles, polyamide imides, polyimines, polybenzoxazoles, etc. Of these, the aromatic polyimides and the phenolic resins are preferred. In order to be most effective in reducing chipping of the outer portion of the composite rim, the inner layer of the composited rim should have a modulus of elasticity, no more than two times the modulus of elasticity of the outer layer of the composite rim. This property is controlled through the incorporation of fillers in the composition from which the inner layer of the composite rim is fabricated. Generally from 10 to 60 volume percent as based on the total composition of the inner layer of a filler is used, which means that the inner layer contains from 90 to 40 volume percent the synthetic resin. Suitable fillers include aluminum or other metal particles, glass, metal fibers, silicon carbide, alundum and silicon dioxide. In the case of a phenol formaldehyde resin inner layer, a filler which generally has a modulus of elasticity of under ¾ million p.s.i. as determined by ASTM D-790, to reduce the modulus of elasticity of the composition generally is desirable. Such fillers include aromatic polyimides and other high temperature resins. The inner layer of the composite rim generally is at least about 50 mils thick and preferably is about 125 mils thick in order to prevent chipping of the composite rim in use. However, at thicknesses greater than 500 mils, the rim becomes too flexible compared to the core and will tend to flex in use and make the holding of tolerance difficult on the work pieces being ground.

Fabrication of the composite rim requires a good degree of concentricity of the two portion of the rim. However, a further advantage of the composite rim is evident in the use of an abrasive filler such as silicon carbide or alundum for matching the modulus of the inner layer of the composite rim to that of the outer layer. The concentricity of the two layers of the rim does not have to be absolute since wearing off of the outer diamond layer to expose the inner abrasive-containing layer will not render the wheel inoperable. The remaining diamond layer can still be used, although at reduced output, until worn completely away. The abrasive in the inner layer will prevent wheel loading and often contributes to the grinding action. While non-abrasive fillers such as aluminum powder may be used to control the modulus of elasticity of the inner layer, they are less desirable. Exposure of the aluminum-containing layer to the surface being ground leads to smearing and wheel loading.

The core material should have a modulus of elasticity of at least 6 million p.s.i. which means that the core preferably is a metal, such as aluminum, which is considerably stiffer than the molded resin from which the composite rim is formed. However, resin cores may be used whenever the modulus is sufficiently great to prevent flexing which causes difficulties in holding tolerances.

The grinding wheels of the present invention generally are from 4 to 20 inches in diameter and from 1/16 to 1 inch in width.

The outer or diamond-containing layer of the composite rim generally is at least about 100 mils in thickness due to the economic consideration of the cost of fabricating the wheel vs. the amount of grinding material available for use. Generally the outer layer should not exceed about 250 mils in thickness in order to avoid flexing.

The following examples are illustrative of the invention.

EXAMPLE I

Two compositions are prepared by admixing an essentially linear aromatic polyimide resin binder having a second order transition temperature greater than 500° C. and a room temperature modulus above 350,000 p.s.i. prepared by reacting 4,4'-oxydianiline with pyromellitic dianhydride according to the procedures set forth in U.S. Patent No. 3,249,588 with (A) 25 volume percent of 180 grit diamond and (B) 25 volume percent of 120 grit silicon carbide. Composition (A) is lightly compacted into the cavity formed between a 6 inch diameter circular mold and a 5¾ inch diameter core to a thickness of ½ inch. Composition (B) is then lightly compacted into the cavity formed between preform (A) and a 5½ inch diameter core to a thickness of ½ inch. The composite rim is then further compacted at about 3,000 p.s.i. The mold and composite preform are then heated to a temperature of about 270° C. and subjected to a pressure of about 50,000 p.s.i. The resulting preform is then removed from the mold and heated for approximately 16 hours in a vacuum oven at a temperature of about 300° C. to complete the imidization of the resin. The preform is then free sintered in a substantially inert atmosphere at a temperature of about 450° C. for a period of about 30 minutes. The grinding wheel rim thus formed is then shrink-fitted around an aluminum core coated with a EC–2216 epoxy adhesive manufactured by Minnesota Mining and Manufacturing Company. Following curing of the adhesive, the resulting peripheral diamond grinding wheel is installed on a Gallmeyer and Livingston No. 28 grinder and used to surface grind a work piece of "Carboloy" 370 tungsten carbide of 18 square inches under flood cooling with 2.7 percent aqueous solution of International 218X grinding fluid until the diamond-containing rim is worn down to the inner silicon carbide-containing layer. For this test, the wheel speed is 6280 s.f.p.m., table speed 50 f.p.m. downfeed 0.001 in./reversal and crossfeed 0.100 in./pass. No detachment or chipping of the rim occurred.

EXAMPLE II

This example illustrates a wheel using a single layer diamond-containing rim rather than the composite rim of the present invention. A diamond-containing composition is prepared by admixing 25 volume percent of 120 grit diamonds and 75 volume percent of a polyimide resin prepared from 4,4'-oxydianiline and pyromellitic anhydride according to the procedures set forth in U.S. Patent No. 3,249,588. About 18.62 grams of this composition is compacted at about 4,000 p.s.i. into the cavity formed between a 6 inch diameter circular mold and a 5¾ inch diameter core. The mold and its contents are then heated to about 300° C. and compacted further at about 50,000 p.s.i. The rim is then heat treated for about 16 hours in a vacuum oven at a temperature of about 300° C. to complete the imidization of the resin. The rim is then free sintered in a substantially inert atmosphere at about 450° C. for a period of about 25 minutes. The rim thus formed is shrink fitted over an aluminum core coated with A–1 epoxy adhesive, manufactured by Armstrong Products Company. The core is expanded by applying a pressure to the opposite faces thereof using a pair of indenting dies having raised ring shaped bearing faces with a ¼ inch radius semicircular cross-section and which ring is 4 inches in diameter, and the core is expanded to impart further strain to give a total permanent rim strain of 0.75 percent. The adhesive is then cured at 70° C. for 2 hours. The wheel is mounted on a Gallmeyer and Livingston No. 28 grinder and used to surface grind a work piece of Walmet WA–5 tungsten carbide 2 inches x 9 inches under the following conditions:

Wheel Speed: 6280 s.f.p.m. (4,000 r.p.m.).
Table Speed: 50 f.p.m.
Downfeed: 0.001 in./reversal.
Crossfeed: 0.050 in./pass.
Cooling: Flood conditions with 2.7 percent aqueous International 218X.

The grinding ratio, which is the ratio of the volume of carbide removed to the volume of wheel worn, is determined at several rim depths. The wheel is previously worn down to the test depths by grinding 1020 grade steel. The results are reported in Table I.

Table I

| Rim depth (inches): | Grinding ratio |
|---|---|
| 0.075–0.100 | 130 |
| 0.071 | 126 |
| 0.045 | 114 |
| 0.025 | 104 |
| 0.000–0.010 | 103 |

As illustrated in Table I, the grinding ratio decreases with use as one uses the portion of the grinding wheel nearer the core.

EXAMPLE III

A diamond-containing composition is prepared and compacted in a mold as described in Example II using a pressure of 4,000 p.s.i. The core is replaced with one of 5½ inch in diameter and a composition, prepared by admixing 6.5 g. of 240 grit SiC, 1.7 g. aluminum powder and 7.92 polyimide powder, is then compacted at about 4,000 p.s.i. in the cavity formed by the core and the previously compacted diamond-containing rim. The mold and its contents are then heated to about 300° C. and compacted further at about 50,000 p.s.i. The rim is then heat treated for about 16 hours in a vacuum oven at a temperature of about 300° C. to complete the imidization of the resin. The composite rim is then free sintered in a substantially inert atmosphere at about 450° C. for a period of about 25 minutes. The composite rim thus formed is shrink fitted over an aluminum core coated with C–7 epoxy adhesive manufactured by Armstrong Products Company. The core is expanded by applying a pressure to the opposite faces thereof using a pair of indenting dies having raised ring shaped bearing faces with a ¼ inch radius semicircular cross-section and which ring is 4 inches in diameter, and the core is expanded to impart a total permanent rim strain of 0.60 percent. The adhesive is then cured at 70° C. for 4 hours. The wheel is mounted on a Gallmeyer and Livingston No. 28 grinder and tested as in Example II. The wheel is worn down to the test depths by grinding 1020 grade steel. The results are reported in Table II.

Table II

| Rim depth (inches): | Grinding ratio |
|---|---|
| 0.095 | 128 |
| 0.071 | 130 |
| 0.048 | 133 |
| 0.025 | 126 |
| 0.000–0.010 | 111 |

These results show the uniformity of grinding ratio throughout wheel life. The lower value for the last few mils wear is expected since the diamond containing layer is not worn out exactly evenly due to lack of exact concentricity of the two layers in the rim.

EXAMPLE IV

The procedure of Example I is used to prepare a 10 x ½ inch peripheral wheel with a composite rim ⅛ inch thick in the diamond-containing layer and ⅛ inch thick in the silicon carbide-containing layer. A C–7 epoxy adhesive, manufactured by Armstrong Products Company, is substituted for the adhesive used in Example I.

This wheel is used to grind tungsten carbide until the diamond layer is completely consumed without detaching or chipping.

EXAMPLE V

The procedure of Example II is followed to produce a sintered diamond-containing outer rim. The rim is placed in a 6 inch diameter mold containing a 5½ inch diameter aluminum core coated on the peripheral surface with cured A-1 epoxy adhesive manufactured by Armstrong Products Company and containing 60 weight percent of aluminum powder. A composition is prepared by admixing 30 volume percent of 200 atomized aluminum powder, 30 volume percent of a particulate polyimide resin made from pyromellitic dianhydride and 4,4'-oxydianiline and passing a No. 40 U.S. Standard sieve and 40 volume percent of a medium flow novolac phenol formaldehyde resin and compacted into the cavity between the rim and core. The phenolic resin is further compacted at 5–8,000 p.s.i. and heated to 160° C. for about 15 minutes to achieve curing. The article is removed from the mold and aged in an air oven at 100° C. for sixteen hours to improve strength properties. The resulting article is a grinding wheel with a composite rim which can be employed for grinding tungsten carbide with essentially complete utilization of the diamond abrasive.

The grinding wheels of the present invention are useful for most types of grinding and offer their greatest advantage over conventional diamond grinding wheels under the most severe grinding conditions encountered in transverse grinding of tungsten carbide under flood cooling conditions.

I claim:

1. A grinding wheel comprising a metal core surrounded by a composite rim formed of two different layers; the outer layer of said composite rim consisting essentially of from 10 to 35 volume percent of diamond grains, from 90 to 50 volume percent of a solid coalesced aromatic polyimide, and from 0 to 40 volume percent of an inert filler, and a distinct inner layer of from 50 to 500 mils in thickness consisting essentially of a resin having a second order glass transition temperature of at least 300° C. and a modulus of elasticity of at least 300,000 p.s.i. as measured by ASTM D–790 containing from 10 to 60 volume percent of an inert filler, and from 90 to 40 volume percent of said resin, the composition of said inner layer having a modulus of elasticity no more than two times the modulus of elasticity of the composition of the outer layer.

2. The grinding wheel of claim 1 wherein the resin from which the inner layer of the composite rim is formed is a novolac phenol formaldehyde resin.

3. The grinding wheel of claim 2 wherein the outer portion of the composite rim is from 100 to 250 mils thick.

4. The grinding wheel of claim 3 wherein the core is formed of aluminum.

5. The grinding wheel of claim 1 wherein the resin from which the inner layer of the composite rim is formed is an aromatic polyimide.

6. The grinding wheel of claim 5 wherein the inner layer filler is selected from the class consisting of silicon carbide and alundum.

7. The grinding wheel of claim 6 wherein the core is formed of aluminum.

8. The grinding wheel of claim 7 wherein the abrasive incorporated as a filler in the inner layer of the composite rim is silicon carbide.

9. A process of forming a grinding wheel comprising the steps of mixing from 90 to 50 volume percent of a coalesceable powder of an aromatic polyimide, from 10 to 35 volume percent of diamond grains and from 0 to 90 volume percent of an inert filler, coalescing said mixture in an annular mold to form an outer rim, compacting a mixture of a novolac phenol formaldehyde resin and an inert filler in a mold which utilizes the inwardly facing annular surface of said outer rim to define the outer annular surface thereof, curing said phenol formaldehyde resin to form a composite rim the composition of the inner layer of which has a modulus of elasticity no more than two times the modulus of elasticity of the outer composition.

10. The process of claim 9 wherein a metal grinding wheel core is used to form the inner annular surface when molding the novolac phenol formaldehyde inner layer of the composite rim and the composite rim is thus mounted on said metal grinding wheel core.

11. The process of claim 9 wherein the metal grinding wheel core is aluminum.

12. A process of forming a grinding wheel comprising the steps of mixing from 90 to 50 volume percent of a coalesceable powder of an aromatic polyimide, from 10 to 35 volume percent of diamond grains and from 0 to 40 volume percent of an inert filler, compacting said mixture in an annulur mold to form a preform, compacting a mixture consisting essentially of from 10 to 60 volume percent of an inert filler and from 90 to 40 volume percent of a coalesceable polyimide powder in a mold which utilizes the inwardly facing annular surface of said preform to define the outer annular surface thereof to form a composite preform having layers of two different compositions, further compacting the composite preform at an elevated temperature, coalescing said preform to form a composite rim the inner layer of which has a modulus of elasticity no more than two times the modulus of elasticity of the outer layer, and mounting said composite rim on a core to form a grinding wheel.

13. The process of claim 12 wherein the inner layer filler is selected from the class consisting of silicon carbide and alundum.

14. The process of claim 13 wherein the core is formed of metal.

15. The process of claim 14 wherein the composite rim is mounted on the core by shrink-fitting the composite rim on a core which has been coated with an adhesive.

16. The process of claim 15 wherein the abrasive filler in the inner portion of the composite rim is silicon carbide.

17. The process of claim 16 wherein the core is aluminum.

References Cited

UNITED STATES PATENTS

| | | | |
|---|---|---|---|
| 2,150,886 | 3/1939 | Pyl | 51—298 |
| 3,179,631 | 4/1965 | Endrey | 51—298 |
| 3,283,448 | 11/1966 | Thompson | 51—298 |
| 3,295,940 | 1/1967 | Gerow | 51—298 |

DONALD J. ARNOLD, Primary Examiner

U.S. Cl. X.R.

51—298